(12) United States Patent
Hayashi

(10) Patent No.: US 7,120,710 B2
(45) Date of Patent: Oct. 10, 2006

(54) CONTROLLER FOR DATA RECORDER

(75) Inventor: Koji Hayashi, Hashima (JP)

(73) Assignee: Sanyo Electric Co., Ltd., Osaka (JP)

( * ) Notice: Subject to any disclaimer, the term of this patent is extended or adjusted under 35 U.S.C. 154(b) by 126 days.

(21) Appl. No.: 10/814,356

(22) Filed: Mar. 31, 2004

(65) Prior Publication Data

US 2004/0184374 A1 Sep. 23, 2004

Related U.S. Application Data

(62) Division of application No. 09/717,771, filed on Nov. 21, 2000, now abandoned.

(30) Foreign Application Priority Data

Nov. 22, 1999 (JP) ................................ 11-331419
Oct. 23, 2000 (JP) ............................. 2000-322550

(51) Int. Cl.
*G06F 3/06* (2006.01)
*G11B 7/0045* (2006.01)

(52) U.S. Cl. .................. 710/59; 369/47.33; 369/47.34; 369/53.11

(58) Field of Classification Search ............... 369/47.3, 369/47.31, 47.33, 47.34, 30.23, 53.18, 53.11; 710/59; G11B 7/00, 7/0045, 7/004; G06F 3/06
See application file for complete search history.

(56) References Cited

U.S. PATENT DOCUMENTS

| 4,507,767 A | 3/1985 | Takasugi |
|---|---|---|
| 4,546,462 A | 10/1985 | Koishi et al. |
| 4,800,548 A | 1/1989 | Koishi et al. |
| 4,831,611 A | 5/1989 | Sasaki et al. |
| 4,858,219 A | 8/1989 | Yoshikawa |
| 4,860,272 A | 8/1989 | Nishikawa et al. |
| 5,010,534 A | 4/1991 | Enari et al. |
| 5,161,144 A | 11/1992 | Takeuchi et al. |
| 5,170,389 A | 12/1992 | Numata et al. |
| 5,212,678 A | 5/1993 | Roth et al. |
| 5,220,545 A | 6/1993 | Tomimitsu |
| 5,289,440 A | 2/1994 | Bakx |
| 5,305,298 A | 4/1994 | Yokata |
| 5,317,553 A | 5/1994 | Ohga et al. |
| 5,436,875 A | 7/1995 | Shinada |
| 5,463,607 A | 10/1995 | Roth et al. |
| 5,477,516 A | 12/1995 | Takezawa |
| 5,491,677 A | 2/1996 | Sasaki |
| 5,521,893 A | 5/1996 | Yamasaki |
| 5,532,991 A | 7/1996 | Sasaki |
| 5,586,093 A | 12/1996 | Honda et al. |
| 5,680,379 A | 10/1997 | Ishida et al. |
| 5,692,366 A | 12/1997 | Hardesty |

(Continued)

FOREIGN PATENT DOCUMENTS

EP 0 507 571 10/1992

(Continued)

*Primary Examiner*—A M Psitos
(74) *Attorney, Agent, or Firm*—Fish & Richardson P.C.

(57) ABSTRACT

A controller for a data recorder controls data recording to prevent buffer overrun errors. The data recorder emits a laser beam against a recording medium to record data. The data has a level that determines the power of the laser beam. When there is a possibility of a buffer overrun, the controller interrupts data recording. The controller interrupts data recording when the power of the laser beam is a low level and restarts data recording with the laser beam generated at the low level.

10 Claims, 2 Drawing Sheets

U.S. PATENT DOCUMENTS

| | | |
|---|---|---|
| 5,745,445 A | 4/1998 | Yasukohchi et al. |
| 5,815,472 A | 9/1998 | Kuroda et al. |
| 5,818,801 A | 10/1998 | Watanabe et al. |
| 5,831,955 A | 11/1998 | Arataki et al. |
| 5,910,935 A | 6/1999 | Takagi et al. |
| 5,953,291 A | 9/1999 | Yasukohchi et al. |
| 6,055,216 A | 4/2000 | Shintani |
| 6,084,731 A | 7/2000 | Uchida et al. |
| 6,115,337 A | 9/2000 | Takagi et al. |
| 6,198,707 B1 | 3/2001 | Yamamoto |
| 6,208,599 B1 | 3/2001 | Fukuda |
| 6,219,309 B1 | 4/2001 | Kuroda et al. |
| 6,269,059 B1 | 7/2001 | Kuroda et al. |
| 6,272,084 B1 | 8/2001 | Maeda |
| 6,438,083 B1 | 8/2002 | Kroon |
| 6,487,616 B1 | 11/2002 | Hayashi |
| 6,522,608 B1 | 2/2003 | Kuroda |
| 6,538,962 B1 | 3/2003 | Hyun |
| 6,570,832 B1 | 5/2003 | Yamamoto |
| 6,584,053 B1 | 6/2003 | Tsukihashi |
| 6,587,416 B1 | 7/2003 | Tsukihashi |
| 6,594,213 B1 | 7/2003 | Hayashi |
| 6,693,857 B1 | 2/2004 | Willis |
| 6,775,211 B1 | 8/2004 | Tsukihashi |

FOREIGN PATENT DOCUMENTS

| | | |
|---|---|---|
| EP | 0 974 966 | 1/2000 |
| JP | 63-52393 | 3/1988 |
| JP | 1-312736 | 12/1989 |
| JP | 1312736 | 12/1989 |
| JP | 2-223066 | 9/1990 |
| JP | 3-228266 | 10/1991 |
| JP | 3260958 | 11/1991 |
| JP | 4-103079 | 4/1992 |
| JP | 5-282696 | 10/1993 |
| JP | 6076401 | 3/1994 |
| JP | 6162511 | 6/1994 |
| JP | 8-147879 | 6/1996 |
| JP | 10-49990 | 2/1998 |
| JP | 10-63433 | 3/1998 |
| JP | 10241165 | 9/1998 |
| JP | H11-66745 | 3/1999 |
| JP | 11-259982 | 9/1999 |
| JP | 2000-40302 | 2/2000 |
| KR | 1998-028125 | 7/1998 |
| KR | 1999-024893 | 4/1999 |

CONTROLLER FOR DATA RECORDER

CROSS-REFERENCE TO RELATED APPLICATION

This application is a divisional and claims the benefit of priority under 35 USC 120 of U.S. application Ser. No. 09/717,771, filed Nov. 21, 2000 now abandoned, which claims the benefit of foreign priority under 35 USC 119 of Japanese applications 11-331419, filed Nov. 22, 1999 and 2000-322550, filed Oct. 23, 2000. The disclosure of the prior applications is considered part of and is incorporated by reference in the disclosure of this application.

FIELD OF THE INVENTION

The present invention relates to a data recorder, and more particularly, to a controller for a data recorder having a buffer memory for storing data provided from an external device and recording the stored data of the buffer memory on a recording medium.

BACKGROUND OF THE INVENTION

An optical disc recorder records data on an optical disc, which serves as a recording medium. A CD-DA family compact disc-recordable (CD-R) drive is one type of optical disc recorder that is widely used. A CD-R is a so-called write-once optical disc on which data is written only once. The recorded data cannot be physically deleted. A laser beam is irradiated against the optical disc from an optical head of the CD-R drive. The heat of the leaser beam melts a dye and forms recording pits on a recording layer of the optical disc. Data is recorded on the disc by changing the reflecting rate of the recording layer.

The optical disc recorder includes a buffer memory and an encoder. The buffer memory temporarily stores data provided from an external device, such as a personal computer. The encoder reads the data from the buffer memory and encodes the read data to record the data on the optical disc.

In such an optical disc recorder, if, for example, the rate of data transmission from the external device is slower than the recording data transmission rate of the optical disc (write speed), the transmission rate of the recording data output from the encoder is faster than the transmission rate of the data provided to the buffer. This decreases the amount of the data stored in the buffer memory. If the decrease continues, the data amount ultimately becomes null and the buffer memory becomes empty. This stops the stream of data to the encoder and causes an interruption in the data recorded on the optical disc. This problem is referred to as buffer underrun. The interruption in the data recorded on the optical disc resulting from buffer underrun is referred to as a buffer underrun error.

Data is recorded on an optical disc using a recording technique that designates the file group recorded on the optical disc (e.g., disc at once, track at once). Thus, if a buffer underrun error occurs, the entire optical disc becomes unusable when employing disc at once, and the track undergoing recording becomes unusable when employing track at once.

Recent CD-R drives record data at a speed four times or eight times the normal recording speed. Further, recent personal computers have multitasking functions to operate CD-R drives. This has increased the tendency of the occurrence of buffer underrun errors.

Packet writing is one type of data recording that records data in packet units. Packet writing records data on an optical disc when the data reaches the capacity of the packet. This prevents the occurrence of buffer underrun errors. However, the link blocks must be formed to connect packets in packet writing. The link blocks decrease the recording capacity of the optical disc. Further, there are CD-ROM drives that are not capable of handling packet writing. Such CD-ROM drives cannot reproduce data written to optical discs through packet writing. In other words, the CD-ROM compatibility required by the CD-R standard (Orange Book Part II) does not include packet writing. For example, packet writing cannot be applied for a CD-DA player. Thus, a CD-R drive cannot record CD-DA audio data through packet writing. Accordingly, there is a need for preventing buffer underrun errors without employing packet writing.

A CD-rewritable (CD-RW) drive is another type of optical disc recorder that is widely used. A CD-RW drive irradiates a laser beam from an optical head against an optical disc. The heat of the laser beam causes phase changes between amorphic and crystalline to form recording pits on the recording layer of the optical disc. Data can be repeatedly rewritten to optical discs used by the CD-RW drive. Accordingly, the optical disc remains usable even if a buffer underrun error occurs. However, when a buffer underrun error occurs, the data file that was being recorded before the occurrence of the buffer underrun error must be recorded again. This wastes the recording performed prior to the occurrence of the buffer underrun error and increases the recording time.

A magneto-optic disc recorded is another type of known data recorder. The magneto-optic disc recorder irradiates a laser beam from an optical head against a magneto-optic disc. This applies residual magnetization to the recording layer of the optical disc and records data on the magneto-optic disc. Mini disc (MD) drives are widely used magneto-optic disc recorders. However, MD drives have the same problem as CD-RW drives.

SUMMARY OF THE INVENTION

It is an object of the present invention to provide a controller for a data recorder that controls data recording in a manner that the continuity of the data is ensured even if the recording of data to a recording medium is interrupted.

To achieve the above object, the present invention provides a control circuit of a data recorder, which records data on a recording data by emitting a laser beam against a recording medium. The control circuit includes an interrupt control circuit for interrupting data recording when a predetermined state is detected. The interruption occurs when the laser beam is generated at a relatively low power level.

A further respect of the present invention provides a controller employed in a data recorder to control interruption and restart of recording data. The data recorder records on a recording medium data stored in a buffer memory by repetitively emitting a laser beam against the recording medium. The laser beam is generated at a high level and a low level. The controller includes an address memory for storing at least one of an address of the recording medium and an address of the buffer memory when data recording on the recording medium is interrupted. Each address indicates a location of data when the recording interruption occurred. A synchronizing circuit sequentially reads the data recorded on the recording medium prior to the recording interruption and the data stored in the buffer memory prior to the recording interruption while synchronizing the recorded data and the stored data. A restart circuit restarts data recording on the recording medium based on the address stored in the address memory. The controller interrupts data recording when the laser beam is generated at a relatively low power level.

Another aspect of the present invention provides a control circuit of a data recorder. The data recorder records data on a recording medium by emitting a laser beam against the recording medium. The data is formed by a plurality of sectors. Each of the sectors includes a synch pattern that has a predetermined number of bits representing a low level. The laser beam is generated at a low power level in accordance with the low level of the synch pattern. The controller includes an interrupt control circuit for continuing recording until an interval between sectors appears when detecting a predetermined state and interrupting the recording operation when the laser beam is generated in accordance with the synch pattern of a sector.

Another aspect of the present invention provides a method for interrupting data recording in a data recorder. The data recorder records data on a recording medium by emitting a laser beam against the recording medium. The data is formed by a plurality of sectors. Each of the sectors includes a synch pattern that has a predetermined number of bits representing a low level. The laser beam is generated at a low level in accordance with the low level of the synch pattern. The method includes continuing recording until an interval between sectors appears when a predetermined state is detected, and interrupting the recording operation when the laser beam is generated in accordance with the synch pattern of a sector.

A further aspect of the present invention provides a method for interrupting and restarting data recording in a data recorder. The data recorder records on a recording medium data stored in a buffer memory by emitting a laser beam against the recording medium. The method includes interrupting data recording when a predetermined state is detected, storing in an address memory at least one of an address of the recording medium and an address of the buffer memory when data recording on the recording medium is interrupted. Each address indicates a location of data when the recording interruption occurred. The method further includes sequentially reading the data recorded on the recording medium prior to the recording interruption, synchronizing the recorded data and the stored data, and restarting data recording on the recording medium based on the address stored in the address memory. The interrupting of the data recording is performed when the laser beam is generated at a relatively low power level.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENT

Figure 1:
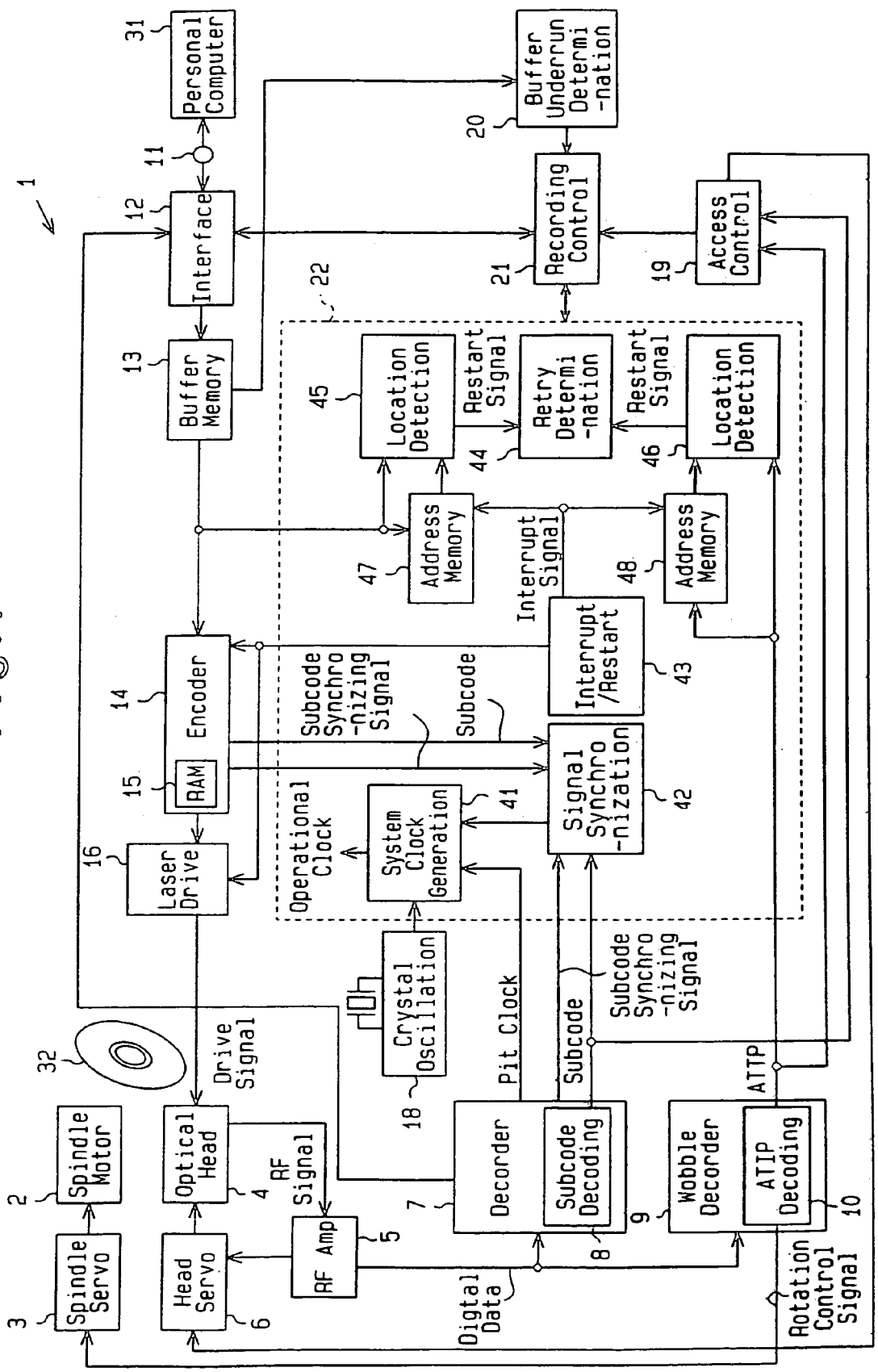
FIG. 1 is a schematic block diagram showing a CD-R drive according to a preferred embodiment of the present invention.

With reference to FIG. 1, a CD-R drive 1 includes a spindle motor 2, a spindle servo circuit 3, an optical head 4, and RF amplifier 5, a head servo circuit 6, a decoder 7, a subcode decoding circuit 6, a decoder 7, a subcode decoding circuit 8, a wobble decoder 9, and ATIP decoding circuit 10, and external connection terminal 11, an interface 12, a buffer memory 13, an encoder 14, an encoder internal RAM 15, a laser drive circuit 16, a crystal oscillation circuit 18, an access control circuit 19, a buffer underrun determination circuit 20, a recording control circuit 21, and a system control circuit 22. The CD-R drive 1 is connected to a personal computer 31 via the external connection terminal 11 to record data, which is provided from the personal computer 31, on an optical disc 32 that complies with the CD-R standards. Further, the CD-R drive 1 provides the personal computer 31 with data reproduced from the optical disc 32.

The spindle motor 2 rotates the optical disc 32. The spindle servo control circuit 3 controls the spindle motor 2 so that the optical disc 32 is rotated using the constant linear velocity (CLV) method in accordance with the rotation control signal generated by the wobble decoder 9.

When reading data, the optical head 4 irradiates a relatively weak laser beam against the optical disc and, from the reflected laser beam, generates a RF signal (high frequency signal) in correspondence with the data recorded on the optical disc. When recording data, the optical head 4 irradiates a relatively intense laser beam (several tens of times greater than the data reading laser beam) against the optical beam 32 to form recording pits on the recording layer to record data. In synchronism, with the recording of data, the optical head 4 generates the RF signal in correspondence with the recorded data from the reflected laser beam.

The RF amplifier 5 amplifies the RF signal, which is provided from the optical head 4, and digitizes the amplified RF signal to generate a digital data signal. The RF signal of the optical head 4 is fed back to the head servo circuit 6 via the RF amplifier 5. The head servo circuit 6 uses the RF signal to perform focusing control, tracking control, and sled feed control. Focusing control focuses the laser beam on the recording layer of the optical disc 32. Tracking control tracks the laser beam along a signal track of the optical disc 32. Sled feed control moves the optical head 4 in the radial direction of the optical disc 32.

The decoder 7 decodes the digital data provided from the RF amplifier 5. Further, the decoder 7 generates a pit clock from the digital data and separates a subcode from the digital data to generate a subcode synchronizing signal.

The subcode decoding circuit 8, which is incorporated in the decoder 7, decodes the subcode. Further, the subcode decoding circuit 8 generates subcode Q channel data (hereafter referred to a sub-Q data) from the decoded subcode.

The wobble decoder 9 extracts a wobble component of 22.05 kHz from a pre-groove signal of the optical disc 32 that is included in the digital data provided from the RF amplifier 5. Then, the wobble decoder generates the rotation control signal of the optical disc 32 from the wobble component.

The ATIP decoding circuit 10, which is incorporated in the wobble decoder 9, uses the wobble component to decode an absolute time in pre-groove (ATIP) and extract absolute time information, or an ATIP address, from the ATIP. The absolute time information indicates addresses of locations in the recording medium.

The interface 12 controls data transmission between the personal computer 31 and the CD-R drive 1.

The buffer memory 13 is a ring buffer that includes a synchronous dynamic random access memory (SDRAM), which preferably has a FIFO configuration, and the buffer memory 13 stores data provided from the personal computer 31 via the interface 12. Data stored at one address of the buffer memory 13 corresponds to data recorded at one sector of the optical disc 32.

An interrupt/restart circuit 43 of the system control circuit 22 controls the encoder 14. The encoder 14 reads the data stored in the buffer memory 13 in sector units and encodes the data into recording data for the optical disc 32. The RAM 15, which is incorporated in the encoder 14, stores the necessary data for encoding by the encoder 14 and intermediate operation encoding data. When performing data encoding in compliance with the CD-Rom standard, the encoder 14 adds a synch byte, a header, a CD-ROM data error detection code (EDC), and an error correction code (ECC) to the data. The encoder 14 further performs error correction using a cross interleaved Reed-Solomon code (CIRC), which is a CD error correction code, and eight to fourteen modulation (EFM) on the data. Further, the encoder 14 adds a subcode, which includes the sub-Q data, and a synchronizing signal of the subcode to the data.

The interrupt/restart circuit 43 also controls the laser drive circuit 16, which provides a laser drive signal to the laser beam source of the optical head 4. The voltage of the drive signal is constant when reproducing data and varied in accordance with the recording data output from the encoder 14 when recording data. When the recording data output from the encoder 14 is low (L), recording pits are not formed on the recording layer of the optical disc 32. Thus, the drive signal is set so that its voltage is the same as when data is reproduced. When the recording data is high (H), recording pits are formed on the recording layer of the optical disc 32. Thus, although the voltage of the drive signal differs between track positions, the drive signal is set so that its voltage is several tens of times greater than during data reproduction.

The crystal oscillation circuit 18 generates an oscillation signal based on the oscillation of a crystal oscillator.

The access control circuit 19 selectively refers to the subcode address of the absolute time information in the sub-Q data and the ATIP address of the absolute time information in the ATIP to control the recording control circuit 21 and the head servo circuit 6. This controls access to the optical disc 32.

The data provided to the buffer memory 13 is stored in the buffer memory 13 in a predetermined address order. The buffer underrun determination circuit 20 directly or indirectly determines the amount of data stored in the buffer memory 13 from the address at which writing or reading is presently performed. Based on the data amount, the buffer underrun determination circuit 20 determines whether or not the buffer memory 13 is in a state in which buffer underrun may occur.

Based on the determination result of the buffer underrun determination circuit 20 and in response to a command provided from the personal computer 31, the recording control circuit 21 controls the interface 12, the access control circuit 19, and the system control circuit 22.

The system control circuit 22 includes a system clock generation circuit 41, a signal synchronizing circuit 42, the interrupt/restart circuit 43, a retry determination circuit 44, location detection circuits 45, 46, and address memories 47, 48. These circuits 41–48 are laid out on the same chip of an LSI substrate.

The system clock generation circuit 41 generates from the oscillation signal of the crystal oscillation circuit 18 a reference clock used when recording data. Further, the generation circuit 41 uses a pit clock extracted by the decoder 7 to generate a reproduction clock used when reproducing data. The generation circuit 41 selects the reference clock or the reproduction clock in accordance with the switching control performed by the signal synchronizing circuit 42. The selected clock is sued as a system operational clock of the CD-R drive 1. In accordance with the operational clock, the CD-R drive 1 controls the synchronization of the circuits 7–10, 12–16, and 19–22.

In accordance with the synchronizing signal of the subcode from the decoder 7 and the sub-Q data from the subcode decoding circuit 8, the signal synchronizing circuit 42 controls the recording control circuit 21 so that the recording data output from the encoder 14 is synchronized with the data recorded on the optical disc 32. When performing this control, the sub-Q data of the subcode decoding circuit 8 is associated with the sub-Q data of the encoder 14 after synchronizing the subcode synchronizing signal of the decoder 7 with the subcode synchronizing signal of the encoder 14. The signal synchronizing circuit 42 controls the system clock generation circuit 41 so that the reference clock or the reproduction clock is output.

The recording control circuit 21 controls the interrupt/restart circuit 43. The interrupt/restart control circuit 43 controls the encoder 14 and the laser drive circuit 16 and, when the buffer underrun determination circuit determines that the buffer memory 13 has entered a state in which buffer underrun may occur, provides the address memories 47, 48 with a recording interrupt signal.

The address memory 47 stores the address of the read data in the buffer memory 13 when receiving the recording interrupt signal from the interrupt/restart circuit 43.

The address memory 48 stores the address of the ATIP decoded by the ATIP decoding circuit 10 when receiving the recording interrupt signal from the interrupt/restart circuit 43.

When data is reproduced during a recording restart mode (described later), the location detection circuit 45 compares the address of the data read from the buffer memory 13 with the address stored in the address memory 46. If the data address and the stared address are the same, the location detection circuit 45 activates the recording restarted signal.

When data is reproduced during the recording restart mode, the location detection circuit 46 compares the address of the ATIP decoded by the ATIP decoding circuit 10 with the ATIP address stored in the address memory 48. If the decoded ATIP address and the stored ATIP address are the same, the location detection circuit 46 activates the recording restart signal.

The retry determination circuit 44 instructs the recording control circuit 21 to restart the recording operation of the interface 12, the access control circuit 19, and the system control circuit 22 when the restart signals of the location detection circuits 45, 46 are simultaneously activated. When the two restart signals are not synchronously activated (when the restart signals are activated at different timings), the retry determination circuit 44 instructs the control circuit 21 to repeatedly perform data reproduction in the recording restart mode until the two restart signals are synchronously activated.

The operation of the CD-R drive 1 will now be discussed.

When a user manipulates the personal computer 31 to record data, the personal computer 31 generates a command accordingly. The command is transferred to the recording control circuit 21 via the interface 12. In response to the command, the recording control circuit 21 controls the interface 12, the access control circuit 19, and the system control circuit 22 to record data.

When recording begins, the signal synchronizing circuit 42 switches the operational clock output of the system clock generation circuit 41 to the reference clock. As a result, the circuits 7–10, 12–6, 19–22 of the CD-R drive 1 are synchronized with the operational clock, or the reference clock.

The data provided from the personal computer 31 is stored in the buffer memory via the interface 12 and read from the buffer memory 13 in sector units. The encoder 14 encodes the data read from the buffer memory 13 in sector units to generate recording data. The laser drive circuit 16 provides the optical head 4 with drive signal having a voltage corresponding to the recording data. In accordance with the drive signal, the optical head 4 changes the intensity of the laser beam irradiated against the optical disc 32. This forms recording pits on the recording layer of the optical disc 32 and records data on the optical disc 32. Simultaneously, from the laser beam reflected by the optical disc 32, the optical head 4 reproduces the data recorded on the optical disc 32 as the RF signal. The RF amplifier 5 amplifies the RF signal provided from the optical head 4 to generate digital data. The wobble decoder 9 extracts the wobble component from the digital data and uses the wobble component to generate the rotation control signal. In accordance with the rotation control signal, the spindle servo circuit 3 controls the spindle motor 2 so that the optical disc 32 is rotated at a constant linear velocity. The ATIP decoding circuit 10 decodes the ATIP using the wobble component and extracts the ATIP address of the absolute time information in the ATIP.

When the transmission rate of the data provided from the personal computer 31 is slower than the transmission rate of the data recorded in the optical disc 32 (write speed), that is, when the transmission rate of the data provided to the buffer 13 is slower than that of the data output from the encoder 14, the amount of data stored in the buffer memory 13 decreases. When the buffer underrun determination circuit 20 determines that a buffer underrun error may occur in the buffer memory 13, the recording control circuit 21 controls the interrupt/restart circuit 43 so that, before the occurrence of a buffer underrun in the buffer memory 13, the address memories 47, 48 are accordingly provided with the interrupt signal and the output of recording data from the encoder 14 is interrupted.

In this state, when the level of the recording data output from the encoder 14 goes low, the interrupt/restart circuit 43 outputs the interrupt signal and stops the output of the recording data from the encoder 14. In response to the interrupt signal, the address memories 47, 48 store the data address of the buffer memory 13. In other words, the address memory 47 stores the buffer memory address of the data read from the buffer memory 13 when receiving the interrupt signal. The address memory 48 stores the ATIP address of the ATIP decoding circuit 10 when receiving the interrupt signal.

When the output of the recording data from the encoder 14 is interrupted, the transmission of the drive signal from the laser drive circuit 16nto the optical head 4 is impeded. This stops the emission of the laser beam from the optical head 4 and interrupts the recording of data on the optical disc 32.

When the interrupt/restart circuit 43 outputs the interrupt signal, the sector of the data being output from the encoder 14 is recorded on the optical disc 32. The interrupt signal of the interrupt/restart circuit 43 may be output at times between sectors of the recording data.

Subsequent to the recording interruption, the data provided from the personal computer 31 is stored in the buffer memory 13 via the interface 12. As the amount of data stored in the buffer memory 13 increases, the state in which a buffer underrun may occur no longer exists. When the buffer underrun determination circuit 20 determines that buffer underrun is not likely to occur, the recording control circuit 21 controls the access control circuit 19 and the system control circuit 22 to perform data reproduction in the recording restart mode.

When data reproduction is performed in the recording restart mode, the access control circuit 19 controls the head servo circuit 6. The head servo circuit 6 controls focusing, tracking, and sled feed of the optical head 4 to move the optical head 4 to a sector location that is prior by a predetermined number of sectors from the sector at which the recording interruption occurred. The optical head 4 then irradiates the laser beam from that sector location.

The interrupt/restart circuit 43 controls the laser drive circuit 16 so that a drive signal having a constant voltage is output from the laser drive circuit 16. This results in the optical head 4 irradiating the optical disc 32 with a relatively weak laser beam. The reflected laser beam reproduces the data recorded on the optical disc prior to the recording interruption, and the optical head 4 outputs the RF signal. The RF signal is amplified by the RF amplifier 5 and converted to digital data. The decoder 7 decodes the digital data, extracts a pit clock from the digital data, and separates a subcode from the digital data. A subcode synchronizing signal is generated from the subcode. The subcode is decoded by the subcode decoding circuit 8 to generate the sub-Q data.

When data reproduction in the recording restart mode is started, the signal synchronizing circuit 42 switches the operational clock from the reference clock of the crystal oscillation circuit 18 to the reproduction clock of the decoder 7. The circuits 7–10, 12–16, 19–22 of the CD-R drive 1 are operated in accordance with the reproduction clock. By using the reproduction clock, the data recorded on the optical disc 32 prior to the recording interruption is accurately reproduced.

The recording control circuit 21 controls the interrupt/restart circuit 32 to instruct the encoder 14 to restart the output of the recording data. The encoder 14 goes back by a predetermined number of sectors from the data address of the buffer memory 12 at which the recording interruption occurred and starts reading data in sector units from that sector of the buffer memory 13. The encoder 14 adds a synch byte, a header, an ED, and an ECC to the read data, performs the CIRC and EFM processes, and adds a subcode, which includes the sub-Q data, and the subcode synchronizing signal to the read data.

The drive signal of the laser drive circuit 16 is constant during data reproduction in the recording restart mode. In other words, the drive signal of the laser drive circuit 16 has a low voltage. Accordingly, laser irradiation does not affect the data recorded on the optical disc prior to the interruption.

The signal synchronizing circuit 42 controls the access control circuit 19 via the recording control circuit 21 and synchronizes the data recorded on the optical disc 32 with the recording data output from the encoder 14. In other words, the signal synchronizing circuit 42 controls the recording control circuit 21 and the access control circuit 19 so that the subcode synchronizing signal of the decoder 7 is synchronized with the subcode synchronizing signal of the encoder 14 and the sub-Q data of the subcode decoding circuit 8 is associated with the sub-Q data of the encoder 14.

The location detection circuit 45 compares the address of the data read from the buffer memory 13 with the address stored in the address memory 47 and activates the restart signal when the data address and the stored address are the same. The address stored in the address memory 47 is the address of the data read from the buffer memory 13 when the recording of data is interrupted.

The location detection circuit 46 compares the ATIP address of the ATIP decoding circuit 10 with the ATIP address stored in the address memory 48 and activates the restart signal when the ATIP address and the stored address are the same. The ATIP address stored in the address memory 48 is the ATIP address decoded by the ATIP decoding circuit 10 when the recording of data is interrupted.

When the restart signals of the location detection circuits 45, 46 are simultaneously activated, the retry determination circuit controls the interface 12, the access control circuit 19, and the system control circuit 22 via the recording control circuit 21. The signal synchronizing circuit 42 switches the operational clock of the system clock generation circuit 41 from the reproduction clock to the reference clock when recording is restarted.

Upon the restart of the recording, the address of the data read from the buffer memory 13 shifts to the address next to the address at which data recording was interrupted. Further, the address memory 48 and the location detection circuit 46 shift the sector location of the optical disc 32 irradiated by the laser beam to the sector location next to the sector location at which data recording was interrupted. In this state, the signal synchronizing circuit 42 synchronizes the recording data output from the encoder 14 with the data recorded on the optical disc 32. Accordingly, the data of the sector next to the sector at which data recording was interrupted is recorded upon the restart of the recording. In other words, sectors of data are recorded without any interruptions when restarting recording. This ensures the continuity of the recorded data awhile preventing the occurrence of a buffer underrun error.

As described above, when the level of the recording data output from the encoder 14 goes low, the interrupt/restart circuit 43 outputs the interrupt signal and stops the output of the recording data from the encoder 14. Thus, when the recording operation is restarted, the recording data output from the encoder 14 is low, and the laser drive circuit 16 outputs a drive signal, the level of which is the same as that when data is reproduced. Accordingly, the power of the laser beam emitted from the optical head 4 is relatively low. That is, the laser beam power of the optical head 4 is low when restarting the recording operation at the same data recording location. Therefore, data that has already been recorded is not damaged even if the recording restart location is offset from where it should be. Further, since the laser beam is not emitted against the recording section corresponding to the low level data, the diameters of pits do not become non-uniform.

For example, if the high level of the recording data were output from the encoder 14, the drive signal output but the laser drive circuit 16 would have a voltage level that is several tens of times greater than when data is reproduced. Thus, the power of the laser beam output from the optical head 4 would be several tens of times greater than that during the data reproduction operation. However, it is difficult to instantaneously activate the laser power of the optical head 4 to several tens of times greater than that during the data reproduction. To do so, a certain time period would be necessary. Thus, it would take time to increase the laser power to a desired level when activating the optical head 4 simultaneously with restarting the recording operation. Such delay would form a non-recording section on the optical disc 32 and produce an interruption in the recording data.

Further, when restarting the recording operation, if the optical head 4 emits the laser beam against the wrong data sector of the optical disc 32, data may be rewritten to a sector on which data has already been recorded. In such case, if a high power laser beam is emitted against a recording layer of the optical head 32 at which recording pits have already been formed, the recording pits may be enlarged and may overlap with recording pits of other sectors or tracks. Consequently, data would not be recorded correctly. Further, if the timing of the recording restart is delayed, data is not recorded at the recording restart position. This may divide a pit into two and record erroneous data. Even if the location where the recording is restarted exactly matches the location where the interruption occurred, the power of the laser beam prior to the interruption differs slightly from the subsequent to the restart. This would cause the recording pits at the recording restart position to have non-uniform sizes that result in data read errors.

In the preferred embodiment, the recording operation is interrupted at a time at which the level of the recording data output from the encoder 14 goes low. Thus, the power of the laser beam output from the optical head 4 is low when the recording operation is restarted. As a result, the above-described problems do not occur.

The optimal time for interrupting the writing of data is at the output of synch pattern data located to the head of each sector. In the CD standards, a synch pattern has 24 bits and includes 11 high bits and 11 low bits. In other words, the head of each sector includes a period of 11 consecutive low bits, which is the longest low period in the CD standards. An address is designated for each sector. Thus, the address memories 47, 48 hold address data corresponding to sector addresses. Accordingly, the optimal time for interrupting data writing would be during the synch pattern of a sector. By interrupting the writing of data in this manner, it is not necessary to activate the laser power of the optical head 4 when restarting the recording operation and the formation of abnormal recording pits due to the rewriting of recording data is prevented.

It is preferred that the buffer underrun determination circuit 20 determine that there is a possibility of a buffer underrun occurring when at least one sector of data is still in the buffer memory 13.

When the two restart signals of the location detection circuits 45, 46 are not synchronously activated (when the two restart signals are activated at different times), the retry determination circuit 4 repeatedly performs data reproduction in the recording restart more until the two restart signals are synchronously activated. In other words, if an external disturbance occurs for one reason or another (e.g., the application of an external impact to the CD-R drive), the elements 2–22 of the CD-R drive 1 may function erroneously such that the two restart signals are not synchronously activated. Thus, the retry determination circuit 44 repeats data reproductions to avoid the influence of an external disturbance. If the restart signals of the position detection circuits 45, 46 are simultaneously activated, the retry determination circuit 44, the position detection circuit 45, and the address memory 47 may be deleted.

Figure 2A:
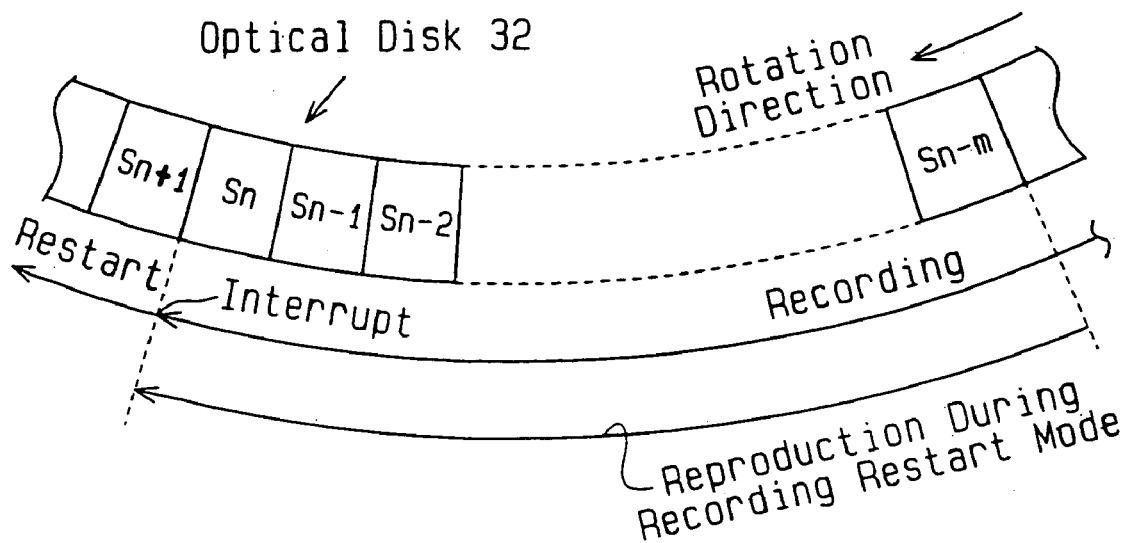
FIG. 2(a) is a schematic diagram showing a sector of an optical disc.
Figure 2B:
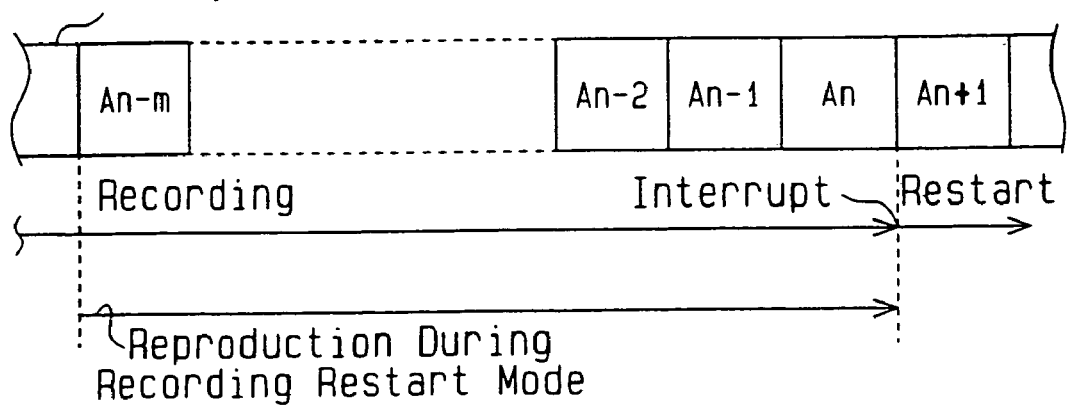
FIG. 2(b) is a diagram illustrating addresses of a buffer memory of the CD-R drive of FIG. 1.

FIG. 2(A) is a schematic view showing a sector of the optical disc 32. FIG. 2(b) is a diagram illustrating the addresses of the buffer memory 13. Sectors Sn+1, Sn, Sn−1, Sn−2, . . . , Sn−m shown in FIG. 2(a) are respectively associated with addresses An+1, An, An−1, An−2, . . . , An−m shown in FIG. 2(b).

During recording, data is read from the buffer memory 13 in the order of addresses An−m, . . . , An−2, An−1, An, and the recording data encoded by the encoder 14 is recorded on the optical disc 32 in the order of sectors Sn−m, . . . , Sn−2, Sn−1, Sn. For example, if the buffer underrun determination circuit 20 determines during the recording of data that a bus underrun may occur at address An, the data of sector Sn, which is associated with address An, is recorded. However, the recording of data is interrupted from the sector Sn+1, which is associated with address An+1.

When the recording of data is interrupted, address An is stored in the address memory 47, and the address of the ATIP decoded from the data recorded at sector Sn is stored in the address memory 48. Afterward, when the buffer underrun determination circuit 20 determines that a buffer underrun is no longer likely to occur, data reproduction in the recording restart mode is commenced from sector Sn−m by going back from sector Sn, at which recording was interrupted, by a predetermined number of sectors (in this case, m sectors).

When data reproduction is commenced, data is read from the buffer memory 13 from address An−m by going back from address An, at which recording was interrupted, by a predetermined number of addresses (m addresses). The read data is encoded into recording data by the encoder 14.

The signal synchronizing circuit 42 synchronizes the recording data output from the encoder 14 with the data recorded on the sectors Sn−m to Sn of the optical disc 32. Then, when the address of the data read from the buffer memory 13 matches the address An stored in the address memory 47, the restart signal of the location detection circuit 45 is activated. When the address of the ATIP decoded by the ATIP decoding circuit 10 matches the ATIP address of the sector Sn stored in the address memory 48, the restart signal of the location detection circuit 46 is activated. When the two restart signals of the location detection circuits 45, 46 are simultaneously activated, the retry determination circuit 44 restarts the recording of data from sector Sn+1, which is next to the sector Sn at which data recording was interrupted.

It is preferred that the predetermined sector number (m sectors) be sufficient for obtaining time period T1, which is required for the spindle serve circuit 3 to control the spindle motor 2 and the head servo circuit 6 to control the optical head 4, and time period T2, which is required for synchronization by the signal synchronizing circuit 42. For example, m is set at 10 to 30. The time periods T1, T2 increase as the recording speed of the CD-R drive 1 becomes higher, for example, as the recording speed increases from 4× to 8×. Accordingly, it is preferred that the predetermined sector number be increased as the recording speed increases.

In the present invention, the recording operation is interrupted when the power level of the laser beam becomes low or during the period when the power of the emitted laser beam is low. This prevents the formation of non-uniform recording pits at the recording restart location. Thus, abnormal recording pits are not formed due to the rewriting of data.

The recording operation is interrupted when the power level of the laser beam is low and the synch pattern data of the 11 consecutive, low level bits is output. Further, the address of the sector at which the recording interruption occurred is stored in the address memories. Accordingly, the synch pattern and the sector address facilitate the restart of data recording.

It should be apparent to those skilled in the art that the present invention may be embodied in many other specific forms without departing from the spirit or scope of the invention. Particularly, it should be understood that the present invention may be embodied in the following forms.

(1) The present invention may be applied to a data recorder employing the constant angular velocity (CAV) component, which is extracted by the wobble decoder 9, is generated and used as the operational clock during the recording of data.

(2) The access control circuit 19, the bugger underrun determination circuit 20, the recording control circuit 21, and the system control circuit 22 may be replaced by a microcomputer that includes a CPU, a ROM, and a RAM. In other words, the function of each circuit may be achieved by having a microcomputer perform various operations.

(3) The present invention may be applied to a data recorder (e.g., CD-RW drive, MD drive) that uses a rewriteable recording medium (e.g., CD-RW standard optical disc, MD standard optical disc). In such case, the occurrence of a buffer underrun error is prevented. This decreases the time required for the recording of data.

The present examples and embodiments are to be considered as illustrative and not restrictive, and the invention is not to be limited to the details given herein, but may be modified within the scope and equivalence of the appended claims.

What is claimed is:

1. A controller employed in a data recorder to control interruption and restart of recording data, wherein the data recorder records on a recording medium data stored in a buffer memory by emitting a laser beam against the recording medium, the laser beam being generated at a relatively high level or a relatively low level during a writing operation, wherein the laser beam at the relatively high power level forms a recording pit on a recording layer of the recording medium and the laser beam at the relatively low level does not form a recording pit on the recording layer of the recording medium, the controller comprising:

a buffer underrun determination circuit for determining a buffer underrun warning state based on the amount of data stored in the buffer memory;

a system control circuit for interrupting data recording only if the laser beam is generated at the relatively low power level, the system control circuit including:

an address memory for storing at least one of an address of the recording medium and an address of the buffer memory when data recording on the recording medium is interrupted, each address indicating a location of data when the recording interruption occurred;

a synchronizing circuit for sequentially reading the data recorded on the recording medium prior to the recording interruption and the data stored in the buffer memory prior to the recording interruption and synchronizing the recorded data and the stored data based on a synchronizing signal of a subcode;

restart circuitry for restarting data recording on the recording medium based on the address stored in the address memory.

2. The controller according to claim 1, wherein the data includes synch pattern data, the laser beam is generated at the relatively low power level or the relatively high power level in accordance with the sync pattern data, and the interrupt control circuit interrupts data recording when the laser beam is generated at the relatively low power level in accordance with the synch pattern data.

3. The controller according to claim 1, further comprising a recording control circuit for causing the system control circuit to interrupt data recording when a buffer underrun warning state exists and the laser beam is generated at the relatively low power level.

4. The controller according to claim 2, wherein the data is recorded in the recoding medium in sector units, each sector including sector address data, and wherein the address memory stores the sector address data where the recording interruption occurred.

5. A controller for a data recorder, wherein the data recorder records data on a recording medium by emitting a laser beam against the recording medium, the controller comprising:
 a buffer underrun determination circuit for determining a buffer underrun warning state based on the amount of data stored in the buffer memory;
 a laser drive circuit for generating a laser drive signal and for controlling the power level of the laser beam; and
 an interrupt control circuit for controlling the laser drive circuit to continue recording until the buffer underrun determination circuit determines that the buffer underrun warning state exists and the laser beam is generated at the low power level; and to interrupt the recording only when the buffer underrun determination circuit determines that the buffer underrun warning state exists and the laser beam is generated at the low power level.

6. The controller according to claim 5, wherein the interrupt control circuit controls the laser drive circuit to restart data recording when the laser beam is generated at the low power level.

7. The controller according to claim 5, further comprising:
 an address memory for storing at least one of an address of the recording medium and an address of the buffer memory when data recording on the recording medium is interrupted, each address indicating a location of data when the recording interruption occurred;
wherein the interrupt control circuit controls the laser drive circuit to restart data recording based on the address stored in the address memory.

8. A method for interrupting data recording in a data recorder to prevent the occurrence of a buffer underrun error, wherein the data recorder records on a recording medium data stored in a buffer memory by emitting a laser beam against the recording medium, the method comprising:
 determining whether a buffer underrun warning state exists, based on the amount of data stored in the buffer memory;
 continuing recording until the data recorder enters a predetermined state in which the laser beam is generated at a low power level after determining that the buffer underrun warning state exists; and
 interrupting the recording operation only when the data recorder enters the predetermined state.

9. A method for interrupting and restarting data recording in a data recorder to prevent the occurrence of a buffer underrun error, wherein the data recorder records on a recording medium data stored in a buffer memory by emitting a laser beam against the recording medium, the method comprising:
 determining whether a buffer underrun warning state exists, based on the amount of data stored in the buffer memory;
 interrupting data recording;
 sending a recording interrupt signal to an address memory in response to interrupting data recording;
 storing in an address memory at least one of an address of the recording medium and an address of the buffer memory when data recording on the recording medium is interrupted, the address indicating a location of data when the recording interruption occurred;
 sequentially reading the data recorded on the recording medium prior to the recording interruption; and
 restarting data recording on the recording medium based on the address stored in the address memory;
 wherein data recording is interrupted only if the laser beam is generated at a low power level after determining that the buffer underrun warning state exists.

10. The method according to claim 9, wherein said restarting data recording is performed when the laser beam is generated at a low power level.

* * * * *